Figure 1:
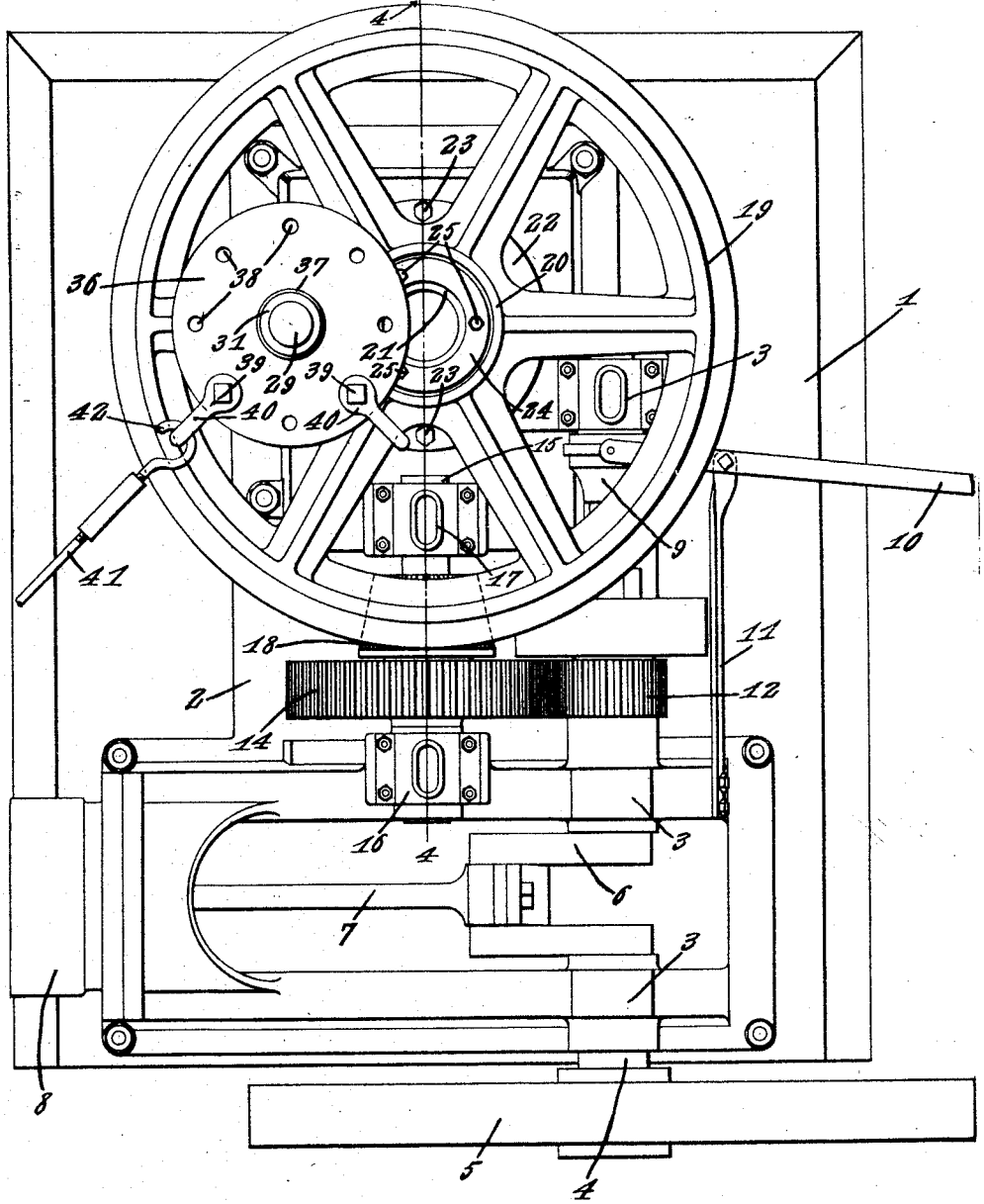

May 26, 1925.

W. F. MEISTER 1,539,759

COMBINED GAS ENGINE AND POWER DEVICE

Filed July 28, 1922   4 Sheets-Sheet 1

W. F. Meister, Inventor

By C. A. Snow & Co.

Attorney

May 26, 1925.  1,539,759
W. F. MEISTER
COMBINED GAS ENGINE AND POWER DEVICE
Filed July 28, 1922   4 Sheets-Sheet 3

W. F. Meister, Inventor

By C. A. Snow & Co.
Attorney

May 26, 1925.
W. F. MEISTER
1,539,759
COMBINED GAS ENGINE AND POWER DEVICE
Filed July 28, 1922  4 Sheets-Sheet 4
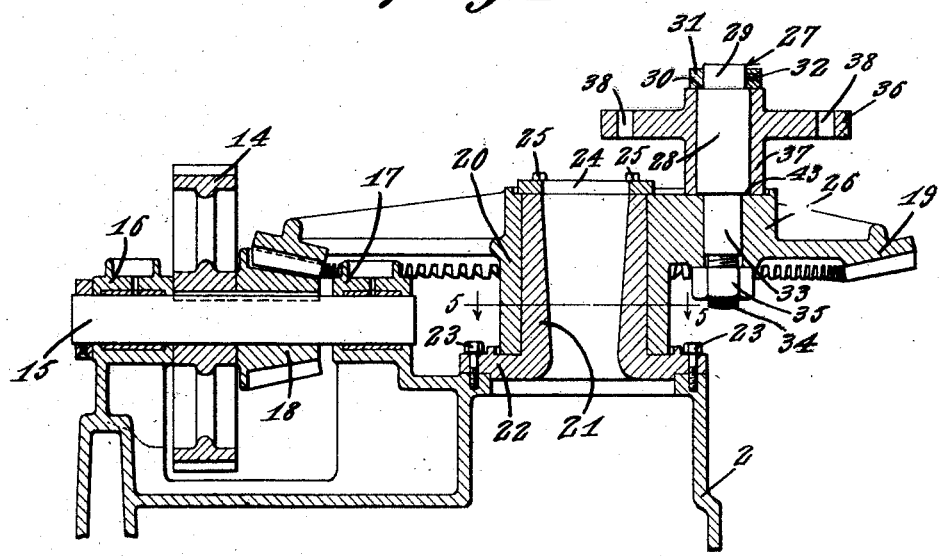
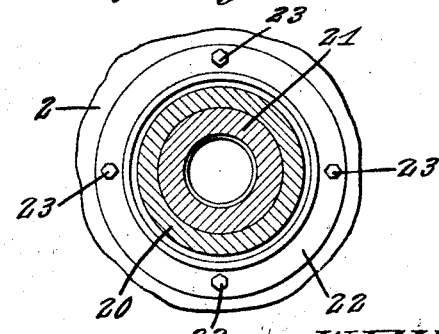
W. F. Meister, Inventor Patented May 26, 1925.

1,539,759

UNITED STATES PATENT OFFICE.

WILLIAM F. MEISTER, OF MARIETTA, OHIO.

COMBINED GAS ENGINE AND POWER DEVICE.

Application filed July 28, 1922. Serial No. 578,203.

*To all whom it may concern:*

Be it known that I, WILLIAM F. MEISTER, a citizen of the United States, residing at Marietta, in the county of Washington and State of Ohio, have invented a new and useful Combined Gas Engine and Power Device, of which the following is a specification.

The device forming the subject matter of this application is adapted to be used in connection with pumping operations and for other purposes, and the invention aims to provide a compact machine whereby motion may be transmitted from an engine to the elements to be driven, the power transmitting mechanism and the engine being combined into a unitary structure thereby to avoid the use of belts and the like, and to produce a structure which may be housed within very small compass. Another object of the invention is to provide a novel means whereby the lines, or driven elements, may be run off in any desired direction with respect to a vertical axis.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 2:
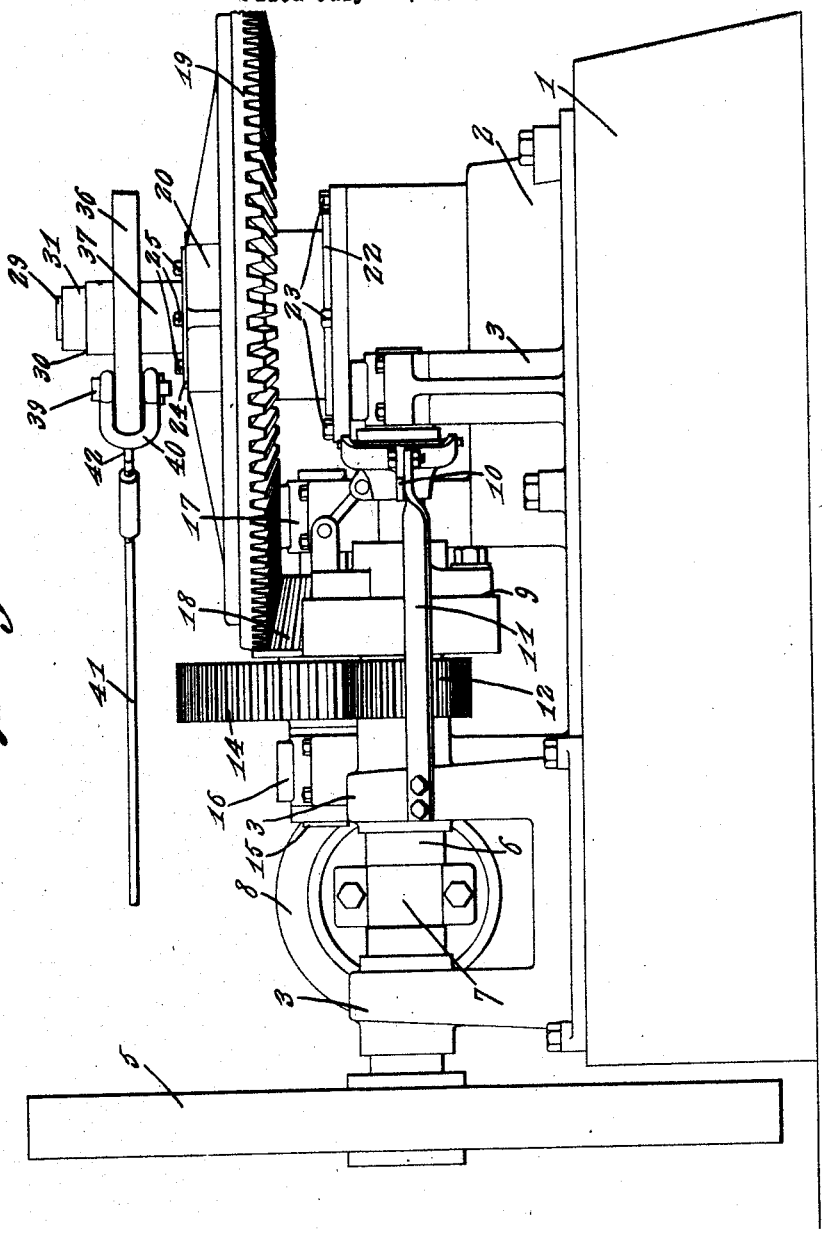
Figure 3:
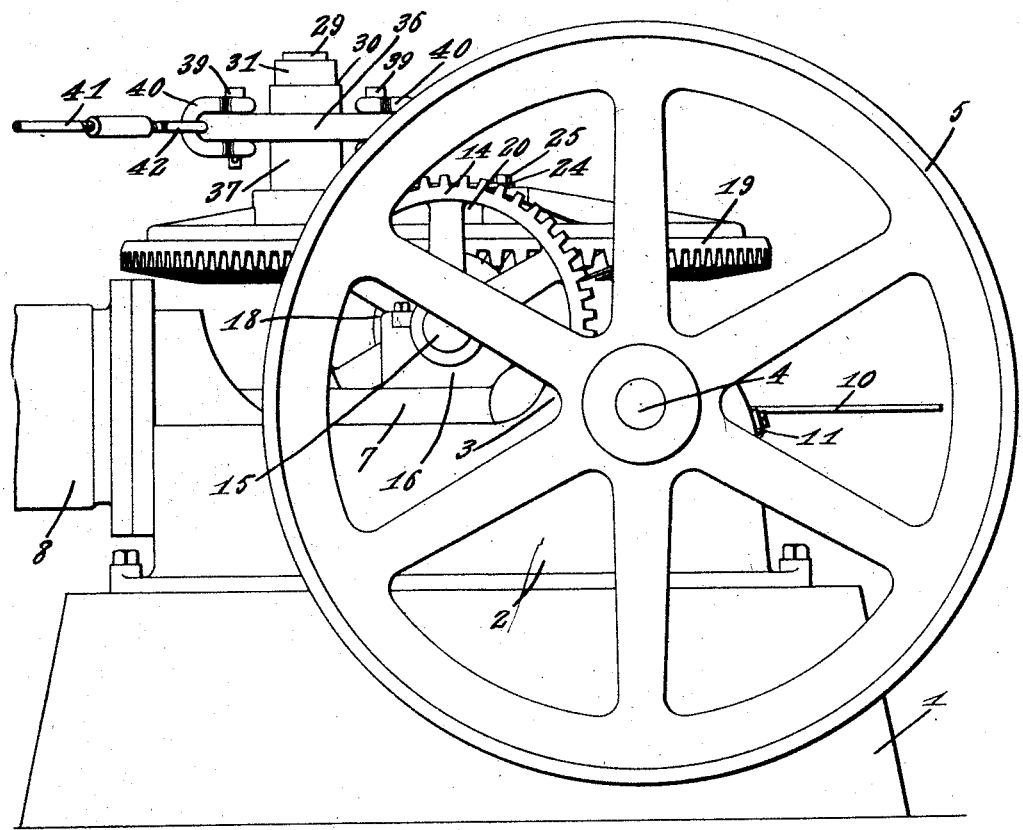

Figure 1 shows in plan, a device constructed in accordance with the invention; Figure 2 is a side elevation; Figure 3 is an elevation wherein the machine is viewed at right angles to the showing of Figure 2; Figure 4 is a section taken approximately on the line 4—4 of Figure 1; Figure 5 is a section on the line 5—5 of Figure 4.

On a suitable base 1 a frame 2 is mounted, the frame carrying bearings 3 wherein a horizontal main shaft 4 is journaled, a fly wheel 5 being mounted on one end of the shaft 4, the shaft having a crank 6 cooperating with a pitman 7 of an engine 8 on the frame 2, the engine being an internal combustion or gas engine preferably. A clutch 9 is interposed in the shaft 4 and is under the control of a lever 10 fulcrumed on a bracket 11 carried by one of the bearings 3. A pinion 12 is secured to the shaft 4 intermediate the ends thereof and is located adjacent to the clutch 9.

The pinion 12 meshes into a gear wheel 14 on an auxiliary shaft 15, the shaft 15 being disposed parallel to the main shaft 4 and being horizontally disposed. The auxiliary shaft 15 is journaled in bearings 16 and 17 on the frame 2, the bearing 16 being disposed adjacent to the engine 8 and the bearing 17 being located adjacent to the geometrical center of the frame 2. A beveled pinion 18 is secured to the auxiliary shaft 15.

The pinion 18 meshes into a horizontally disposed gear wheel 19 having a tubular hub 20 surrounding a tubular bearing 21 having a base plate 22 attached by securing elements 23 to the frame 2, the lower end of the hub 20 of the gear wheel 19 resting on the base plate 22. A retainer 24, such as a ring, is supported on the upper end of the bearing 21 and overlaps the upper end of the hub 20 of the gear wheel 19, to hold the gear wheel on the bearing 21 for rotation, the retainer 24 being secured to the upper end of the bearing 21 by attaching elements 25.

One of the spokes of the gear wheel 19 has a thickened portion 26. The numeral 27 marks a stud, including a bearing 28 provided with a reduced outer end 29 forming a shoulder 30. A retaining device or collar 31 is mounted on the end 29 of the stud 27 and is held thereon by a securing member 32. The body 28 of the stud 27 has a reduced stem 33 forming a shoulder 43, the stem being supplied with a reduced tip 34. The stem 33 is received in the part 26 of the gear wheel 19, the shoulder 43 engaging the upper surface of the part 26. A nut 35 is threaded on the tip 34 and engages the lower surface of the part 26, the stud 27 thus being secured to the gear wheel 19.

A rotatable member or crank disk 36 is provided and has a hub 37 journaled on the body 28 of the stud 27 and located between the part 26 of the gear wheel 19 and the collar 31, the shoulder 30 preventing the collar from binding on the hub 31 of the crank disk, the crank disk thus being supported rotatably on the stud 27 and, particularly, upon the body 28 thereof. The crank disk 36 has any desired number of openings 38 carrying pivot bolts 39 supporting clevises 40, driven members, such as lines 41, being detachably connected at 42 with the clevises. Since the gear wheel 9 is horizontally disposed, the lines 41 may be extended in any desired direction from the crank disk 36.

In practical operation, rotation is imparted to the main shaft 4 by the engine 8, the pitman 7 and the crank 6, the pinion 12 imparting rotation to the auxiliary shaft 15 by way of the gear wheel 14. When the shaft 15 is rotated, the beveled pinion 18 on the shaft 15 imparts rotation to the gear wheel 19, the crank disk 36 moving in an orbit and rotating on its axis, motion being transmitted to all of the lines 41.

The device forming the subject matter of this application is simple and compact and embodies an engine and a power transmitting means, in a unitary structure, it being possible to extend any desired number of the lines 41 horizontally, in different directions.

The pinion 12 is loose on the shaft 4, but may be coupled to the shaft, at the will of an operator, through the instrumentality of the lever 10 and the clutch 9. The bearing 17 is located within the contour of the gear wheel 19 and an adequate support for the shaft 15, at its inner end, thus is afforded, an exceedingly compact structure resulting as Figure 4 will show.

What is claimed is:—

In a device of the class described, a frame, a horizontally operating engine on the frame and comprising a horizontal crank shaft located adjacent to one edge of the frame, a horizontal auxiliary shaft located adjacent to the longitudinal center of the frame and inwardly of the crank shaft, the auxiliary shaft being parallel to the crank shaft, a horizontal gear wheel journaled on the frame for rotation about an axis located approximately in the same plane with the axis of the auxiliary shaft, bearings receiving the auxiliary shaft for rotation, one bearing being located closely adjacent to the engine, and the other bearing being located beneath the gear wheel, a pinion on the auxiliary shaft and meshing with the gear wheel, means on the gear wheel for operating pump connections, and intermeshing gear members on the shafts, the gear member on the auxiliary shaft, the pinion on said shaft, and the first specified bearing, substantially filling the space between the periphery of the gear wheel and the engine.

In testimony that I claim the foregoing as my own, I have hereto affixed my signature in the presence of two witnesses.

WILLIAM F. MEISTER.

Witnesses:
A. E. MOSES,
G. WOODFORD.